US007651758B2

(12) United States Patent
Endres (10) Patent No.: US 7,651,758 B2
(45) Date of Patent: Jan. 26, 2010

(54) SYSTEM FOR IMPROVING THE WEARABILITY OF A SURFACE AND RELATED METHOD

(75) Inventor: William J. Endres, Houghton, MI (US)

(73) Assignee: Endres Machining Innovations LLC, Houghton, MI (US)

( * ) Notice: Subject to any disclaimer, the term of this patent is extended or adjusted under 35 U.S.C. 154(b) by 316 days.

(21) Appl. No.: 11/253,140

(22) Filed: Oct. 18, 2005

(65) Prior Publication Data
US 2007/0087211 A1    Apr. 19, 2007

(51) Int. Cl.
     *B32B 3/00*          (2006.01)
     *B32B 9/00*          (2006.01)
     *B32B 19/00*        (2006.01)
(52) U.S. Cl. .................. 428/172; 428/156; 428/161; 428/408; 428/701; 428/702; 428/697; 428/698; 428/699
(58) Field of Classification Search .............. 428/156, 428/161, 162–164, 167, 172, 408, 701, 702, 428/697, 699, 698, 323, 336, 665, 634; 51/295, 51/307, 309; 175/426, 428, 431, 432, 434
See application file for complete search history.

(56) References Cited

U.S. PATENT DOCUMENTS

| 5,550,090 A | | 8/1996 | Ristic et al. |
| 5,558,789 A | * | 9/1996 | Singh .................. 219/121.69 |
| 5,776,355 A | | 7/1998 | Martin |
| 5,930,646 A | | 7/1999 | Gerung et al. |
| 6,022,761 A | | 2/2000 | Grupen-Shemansky |
| 6,041,875 A | * | 3/2000 | Rai et al. .................. 175/432 |
| 6,117,533 A | | 9/2000 | Inspektor |
| 6,274,492 B1 | | 8/2001 | Klimes et al. |
| 6,465,281 B1 | | 10/2002 | Xu et al. |
| 6,482,289 B1 | | 11/2002 | Fang et al. |
| 6,815,043 B2 | * | 11/2004 | Fleming et al. ............. 428/161 |
| 6,884,499 B2 | | 4/2005 | Penich et al. |
| 6,909,178 B2 | | 6/2005 | Sakamoto et al. |
| 2003/0181935 A1 | | 9/2003 | Gardeski et al. |
| 2005/0095429 A1 | | 5/2005 | Reinhard et al. |

OTHER PUBLICATIONS

International Search Report and The Written opinion of the International Searching Authority, PCT/US06/40624, Int'l filing date: Oct. 18, 2006.

* cited by examiner

*Primary Examiner*—David R Sample
*Assistant Examiner*—Catherine Simone
(74) *Attorney, Agent, or Firm*—Brooks Kushman P.C.

(57) ABSTRACT

A wear surface system and method for preparing same. The wear surface system 10 has a substrate 12 with a surface 13 in which is defined three-dimensional, micro-metered prismatic anchoring sites 14. The sites include hairs that are separated by at least some spaces 16. To the textured surface 18 is applied a coating 24. The coating has substantially conforming three-dimensional features that mate with at least some of the anchoring sites. Upon solidification, the coating becomes hardened and is relatively immune from delamination due to internal and externally applied stresses during exposure to normal wear conditions. One method for improving the wearability of a surface comprises the steps of (1) providing a substrate; (2) texturizing its surface so that it is at least partially imbued with a three-dimensional, micro-metered, prismatic set of anchoring sites; and (3) coating at least a part of the textured surface with a mating coating that becomes hardened upon solidification.

21 Claims, 4 Drawing Sheets

FIG. 1

FIG. 2
(SECTION A-A)

SYSTEM FOR IMPROVING THE WEARABILITY OF A SURFACE AND RELATED METHOD

BACKGROUND OF THE INVENTION

1. Field of the Invention

The invention relates to a system and method for improving the wearability of surfaces that are exposed to wear conditions during their working life.

2. Background Art

The wear phenomenon is generally a physical form of material degradation in that it involves the removal of surface material as a result of mechanical and/or chemical action. Industry realizes that the amount of wear need not be significant before its manifestation becomes quite expensive. For instance, a car can be considered "worn out" following the loss of only a minor amount of material from critical surfaces that are in sliding contact.

It is known that there are various forms of wear: (1) adhesive wear—this occurs when two glissile surfaces slide over each other and debris is removed from one surface which adheres to the other; (2) abrasive wear—this happens when a hard, rough surface interacts with a softer surface, thereby forming indentations in the softer material and creating wear particles; (3) surface fatigue wear—this occurs during repeated sliding or rolling over a, for example, track; and (4) corrosive wear—this occurs with sliding in a corrosive environment, thereby augmenting the physical effects of wear with chemical degradation. All these forms of wear can be exacerbated by elevated temperature.

Cutting tools, because they experience most of the above noted forms of wear, to extreme levels and also at high temperatures, provide a good example of the challenges related to protecting a substrate from wear. Any manufacturer that works with machining materials is exposed to the problems of wear. This includes automotive, truck and engine OEMs and suppliers (cast aluminum, CGI), military equipment manufacturers (fiber reinforced composites including both metal- and polymer-matrix), among many smaller niche applications. Because certain materials are difficult to machine, cutting speeds are reduced. Various industries have recognized that significant manufacturing economies can be realized if the problems of wear can be avoided or ameliorated. Among other industries, the cutting tool industry is one example.

Modern cutting tool materials, including diamond (polycrystalline (PCD) and thick film) and cubic-boron-nitride (CBN), are the hardest known and are becoming routinely used. However, their extremely high cost (compared to tungsten carbide, ceramics and cermets) limits their use in many cases, especially when the least expensive of these materials (tungsten carbide) can be enhanced with alloying and coatings (TiN, TiCN, $Al_2O_3$), thereby reducing its tendency to chemically dissolve into the chip and workpiece at high temperatures. Part of what makes all these substrate materials suitable for metal-cutting applications is their retention of hardness and abrasion resistance at highly elevated temperatures. These coatings, being harder than the substrate, also offer increased abrasion resistance, at least until worn through. Unfortunately, developments in these substrate materials and coatings are quite mature and may offer little more than incremental improvements in the near future.

One problem of prior approaches is the very high temperatures experienced by the cutting tool. Temperatures go up with increased productivity levels (i.e., cutting speed). Coatings have advanced from the basic single TiN CVD (chemical vapor deposition) coating to thinner PVD (physical vapor deposition) coatings and elaborate multi-layer CVD coatings with as many as nine or more alternating layers of different materials. See, e.g., U.S. Pat. No. 6,117,533. Coatings today serve as a hard, thermal barrier with good abrasion and chemical resistance compared to the substrate. However, it is generally known that typical (multilayer) CVD coatings are only 15-20 µm thick, with PVD coatings being only 2-3 µm thick. PVD coatings have to be thinner since their production process induces significant internal stress that causes flaking of thicker coatings under only small applied loads. CVD coatings, though much thicker, are limited in thickness due to the same internal stresses as for PVD coatings, as well as ones that develop due to the coefficient of thermal expansion mismatch across the large rake face surface and the delamination that occurs as the two sides of the interface expand at different rates. Either way, these coatings are thin, and often wear through rather quickly. They still provide resistance to chemical dissolution by dragging atoms of coating through the zone where the coating has worn through. However, their abrasion resistance is virtually gone once wear-through has occurred.

Accordingly, there is a need for an approach to maintain abrasion and chemical dissolution resistance for a significantly longer period of time, whether the application is cutting or one of many other wear surface scenarios. While diamond and CBN possess good abrasion/heat resistance, they are limited in their use (e.g., diamond cannot be used in contact with ferrous alloys due to a high propensity to dissolve in the iron), not to mention they are expensive relative to tungsten carbide. A fundamentally different coating approach may offer a major improvement over the current multilayering efforts and extend protection to more susceptible substrates (e.g., steel, aluminum, magnesium) in other harsh wear environments.

Since a partially worn through coating can sometimes still offer chemical/dissolution protection, a thicker coating would have its greatest impact in more abrasive environments. In the current example of cutting tools, specific work on CGI (Reuter and Schulz, 1999), metal-matrix composites (Hooper et al., 1999; Yanming and Zehua, 2000) and carbon/glass-fiber polymer composites (Gordon and Hillery, 2003) confirm the abrasive wear challenges in machining these materials. Machining of CGI is further hampered in continuous cutting due to its relatively high ductility (compared to gray iron), causing it to create higher temperatures on the cutting tool (Reuter and Schulz, 1999). Polymer-matrix composites along with metal-matrix composites (used significantly in modern aircraft and other lightweight applications) cause wear almost solely through abrasion (Yanming and Zehua, 2000). Since many of these materials are nonferrous, diamond coating in the manner disclosed below could be a huge improvement over current tooling including those with thin diamond films.

General hard-coating technologies include the processes of chemical vapor deposition (CVD) and physical vapor deposition (PVD). CVD coatings can be made thicker, but as a conformal deposition process, films can build up excessively on surface discontinuities and sharp curvature surfaces, especially in high pressure processing utilized to enhance the deposition rate. PVD coating processes, in several instances, are much faster than CVD processes and are able to form evenly despite strong surface curvature changes (Kvasnicka et al., 1999; Novak et al., 1999).

Several subcategories of chemical and physical vapor deposition processing exist. Plasma enhanced chemical vapor deposition (PECVD) is utilized for low temperature CVD processing, atmospheric pressure CVD (APCVD) is used for high deposition rate processing, and low pressure CVD (LPCVD) is extensively used as a low-rate, conformal, and high purity thin film process. PVD processes utilize the vaporization or physical redeposition of a source material onto a substrate. There is a large variety in the methods that make up PVD techniques, but those that allow for high levels of adhesion and good mechanical properties are typically deposited by plasma-based techniques. These include direct current (DC) and radio frequency (RF) sputter deposition, ion beam deposition, and cathodic arc deposition, among others. Some benefits of ion beam and cathodic arc deposition are enhanced deposition rates and high energies of the impinging ions resulting in very good adhesion and film properties (Popovic et al., 2004; Witke et al., 1999).

Another area where coatings are used is in microelectromechanical systems (MEMS). One relevant method is pulsed cathodic vacuum arc (PCVA) deposition of metals, alloys, and semiconductors, which has focused on the development of high-quality high deposition rate conductive silicon films for structural MEMS layers (Xia et al., 2004). The flexibility and capability of the PCVA technique allows for the reactive deposition of metallic oxide, carbide, and nitride compounds using metallic or semi-metallic deposition targets in oxygen-, methane-, or nitrogen-containing gas ambients. This PCVA technique, combined with a high chemical reactivity of the resulting ~98% ionized metallic plasma, allows for the production of high quality and high density hard surface coatings. This technique has been applied extensively in volume production of TiN coatings in the automotive and machine tool industries. The capability of the technique applied to channels with high aspect ratios has been demonstrated for copper metallization at over 5:1 aspect ratios with void-free results (Siemroth and Schuelke, 2000).

As noted, MEMS applications have explored the coating and filling of micro-sized (i.e. below 1 millimeter) features. Such features are produced in non-silicon materials via micromachining. Micromachining focuses on the mechanical, electromechanical and laser processes used to fabricate small features in a wide variety of materials. It is differentiated from lithography whereby patterning is achieved by optical resists and wet chemistry, for example. Mechanical micromachining has grown over the past thirty years and is used in diverse industries such as medical implants and prostheses, semiconductor testing, automotive injection systems, optics, and micro-fluidic systems. Specialized machine tools, available in the marketplace, have closed-loop positioning systems with sub-nanometer resolution capable of machining micron features with sub-micron tolerances. Recent research has successfully machined (mechanically) free-standing structures with a lateral dimension of one micron as well as millimeter-scale mechanical parts with a tolerance of 0.25 microns (Friedrich and Vasile, 1996; Vasile et al., 1997), including micromilling of channels.

Micro electrical discharge machining (micro-EDM) uses a machined, or otherwise shaped, electrode immersed along with the workpiece in a dielectric fluid. Several control schemes are used to initiate an electrical spark in the gap between the shaped electrode and the workpiece. A shaped electrode for micro-EDM-ing of small channels is typically made of brass, which is easily micromachined. CNC control of micro-EDM allows untended batch production of parts. Laser ablation is another process that shows promise for large-scale surface microtexturing.

SUMMARY OF THE INVENTION

The invention includes a wear system that has the characteristic of improved resistance to mechanical and chemical wear. The system includes a substrate that has a surface in which are defined three-dimensional, micro-metered, prismatic anchoring sites. The anchoring sites are characterized as hairs that are separated by spaces, thereby forming a textured surface.

A coating is applied to the textured surface. The coating has substantially conforming three-dimensional features that mate with the hairs of the anchoring sites. Upon solidification, the coating becomes hardened and is relatively immune from delamination due to internal and externally applied stresses during exposure to normal wear conditions.

The main processing steps by which the wear system of the present invention are prepared involve:

(A) providing a substrate;

(B) texturizing the surface of the substrate so that it has three-dimensional, micro-metered, prismatic anchoring sites; and (C) coating the textured surface with a mating three-dimensional coating.

DETAILED DESCRIPTION OF THE PREFERRED EMBODIMENT(S)

Figure 1:
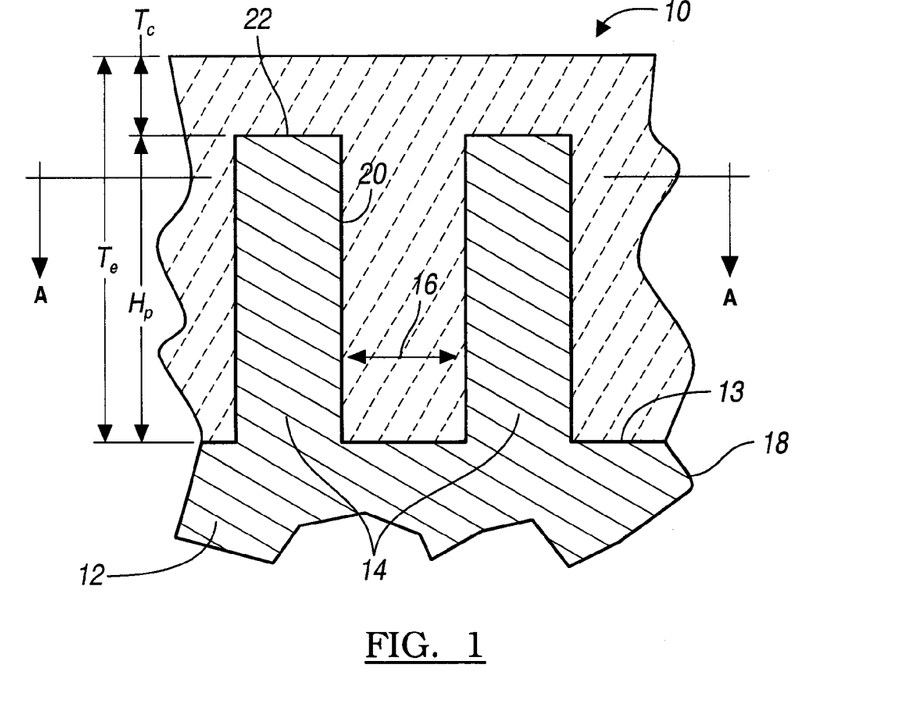
FIG. 1 is a cross-sectional view of a wear-resistant system including a substrate and a coating.
Figure 2:
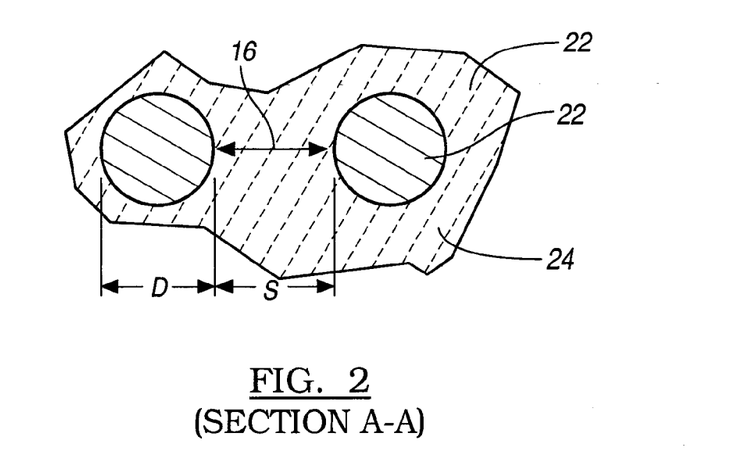
FIG. 2 is a sectional view of the system depicted in FIG. 1 taken along the line A-A thereof.
Figure 3:
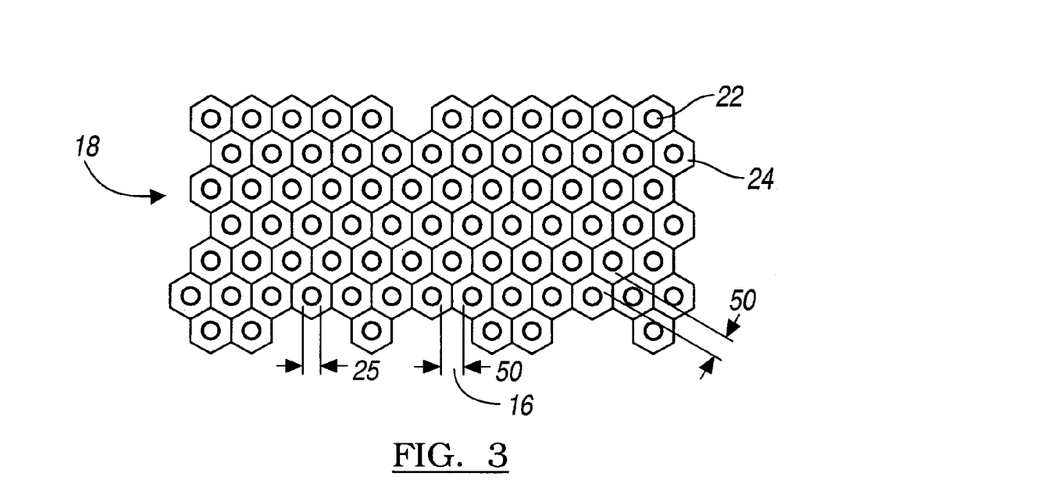
FIG. 3 is a wider-scale view of the system depicted in FIG. 2.

Turning first to FIGS. 1-3, there is depicted a wear system 10 that has the characteristic of improved resistance to mechanical and chemical wear. The system includes a substrate 12 which has a surface 13 in which are defined three-dimensional, micro-metered, prismatic anchoring sites. As used herein, the term "micro-metered" refers to anchoring sites wherein the distance D (FIG. 2) is preferably about 25 microns and the spacing S (FIG. 2) between adjacent anchoring site(s) in some applications is preferably about 50 microns.

As best shown in FIG. 1, the anchoring sites are characterized as hairs 14 that are separated by at least some spaces 16, thereby forming a textured surface 18.

A coating 24 is applied to the textured surface 18. The coating 24 has substantially conforming three-dimensional features that mate with at least some of the hairs 14 of the anchoring sites. Upon solidification, the coating becomes hardened and is relatively immune from delamination due to internal and externally applied stresses during exposure to normal wear conditions.

Preferably, the substrate 12 has a hardness $V_s$. The coating upon solidification has a hardness of $V_c$, so that $V_s$ is less than $V_c$.

As illustrated in FIG. 1, the coating 24 has a "superficial" thickness ($T_c$) and "effective" (or total) thickness $T_e$. As shown in FIG. 1, the effective thickness ($T_e$) then becomes the depth of the micro-texturing plus the nominal coating thickness (e.g., $T_c+H_p$). The micro-metered, prismatic anchoring sites 14 include hairs that have an average height ($H_p$) above a basal or reference surface 13 of the substrate. The hair spacing (S) is in some application is approximately equal to $2T_c$. Preferably, the ratio of S:$H_p$ is in the range of 1:2 to 1:5. Then $T_c$:$H_p$ is in the range of 1:4 to 1:10.

The coating 24 and substrate 12 are also characterized by a coefficient of thermal expansion, respectively $CTE_c$, $CTE_s$. Preferably, $CTE_c$ is approximately the same as $CTE_s$.

Figure 4:
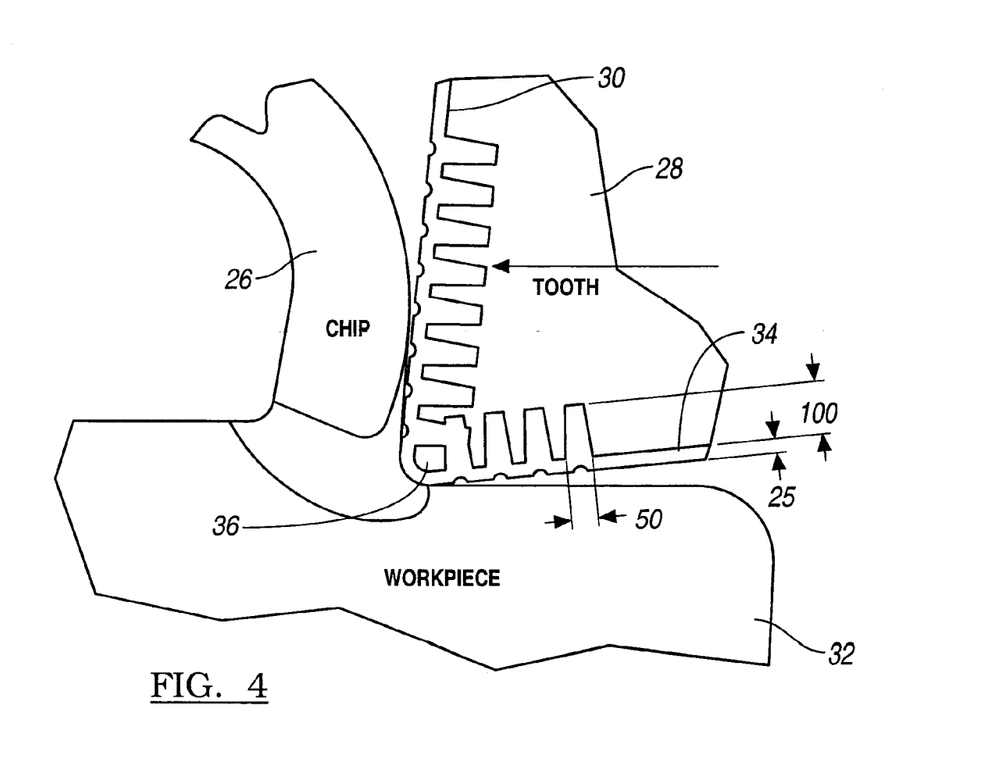
FIG. 4 is a sectional view of a coated cutting tool, illustrating one application of the disclosed method and system, including a rake face and a flank face. (The patterns would be offset into the page to avoid a "loose" piece of substrate at the cutting edge.)

FIGS. 1-3 illustrate some combinations that may be formed if CVD/PVD processes are used in the practice of the present invention. In FIG. 4, the depicted cutting tool 28 has a micro-geometric "hairy" texture with typical dimensions that are called out in microns. As illustrated in FIGS. 2-3, at least some of the hairs 14 are separated by distance (S) that is about 50 microns. In practice, S can be selected so that it is between about 25 microns and about 75 microns. In one example, the spacing (S) is about twice the average diameter (D) of at least some of the hairs 14.

FIG. 4 illustrates one of the many applications of the mating, three-dimensional, micro-metered anchoring sites of the present application. In FIG. 4, the chip 26 becomes separated from a workpiece 32 by a cutting tool having a tooth 28. The tooth 28 has rake 30 and clearance surfaces 34. FIG. 4 is helpful in appreciating one among many contexts of the three-dimensional, micro-metered prismatic anchoring site of the present invention. It should be appreciated that the patterns are offset into the page to avoid the "loose" piece of substrate 36 at the cutting edge.

Figure 5:
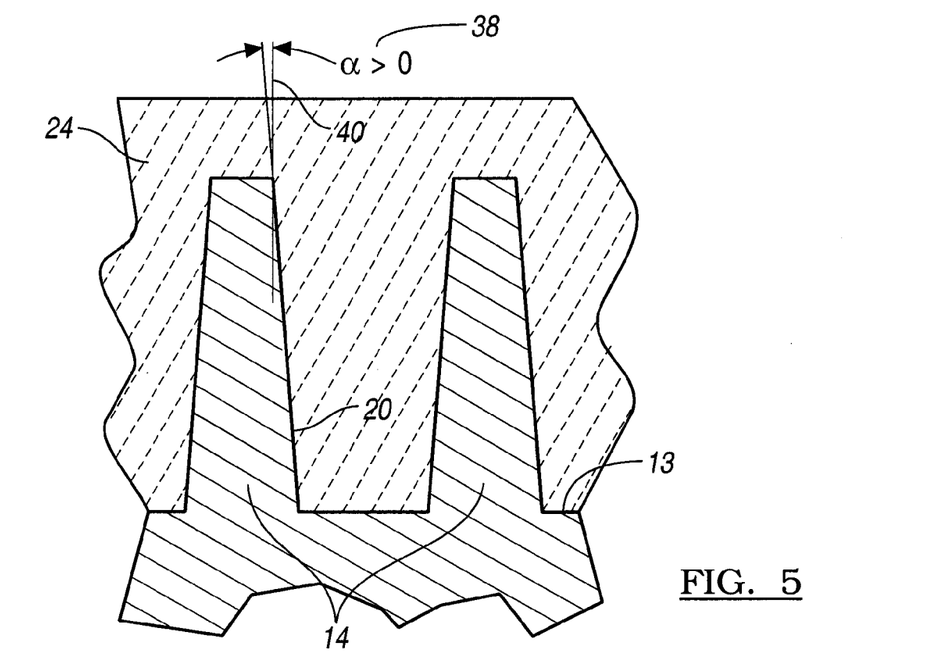
FIG. 5 is a cross-sectional view of an alternate embodiment of the wear-resistant system of the present invention.

In FIG. 5, there is depicted an alternate embodiment of the present invention.

FIG. 5 includes a draft angle alpha and reference numeral 38 that is often needed where CVD or PVD techniques are used in order to avoid keyholing (subsurface voids). The draft angle alpha defines an angle of inclination of the wall 20 to the normal line 40 of the basal surface 13. It will be appreciated that the angle alpha (38) may define the inclination of either wall or both walls of a given hair in relation to the normal line 40 so that the angles alpha are equal, or not. Additionally, it should be appreciated that the draft angles for a given hair may or may not be the same as those desired for other hairs in the textured substrate.

Figure 6:
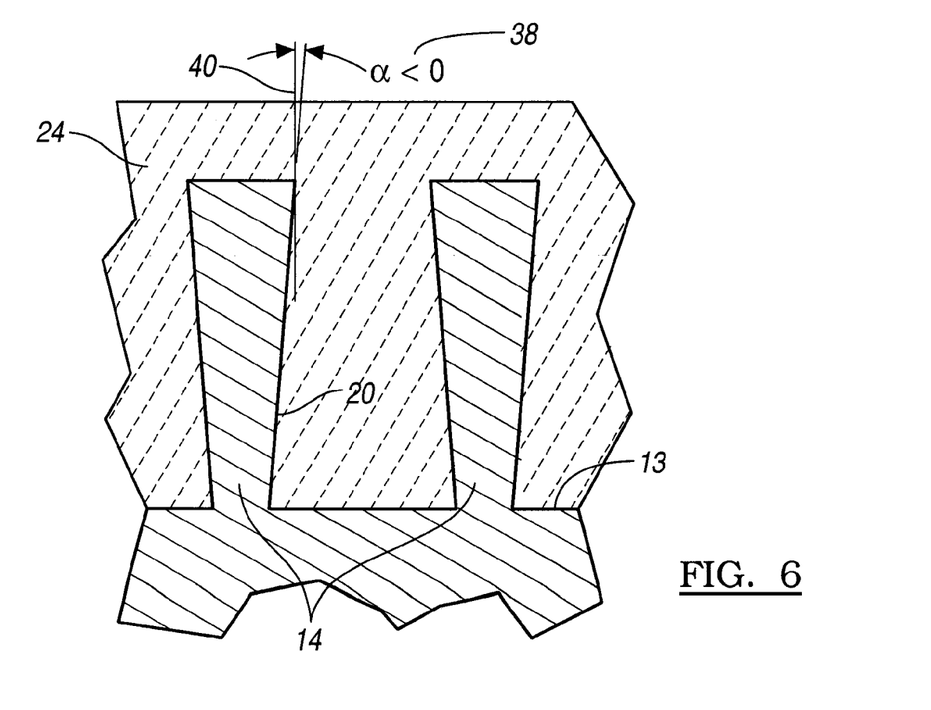
FIG. 6 is a cross-sectional view of another alternate embodiment of the wear-resistant system of the present invention.

In FIG. 6, there is depicted another alternate embodiment of the present invention. In FIG. 5 the draft angle is selected to provide a taper. In FIG. 6, the draft angle is selected to provide a dovetail. The embodiment in FIG. 6 could be suitable for those cases in which a solidifying coating, like a paint, is deployed over the substrate surface and in other cases where stronger adhesion is required between the coating and the substrate.

Figure 7:
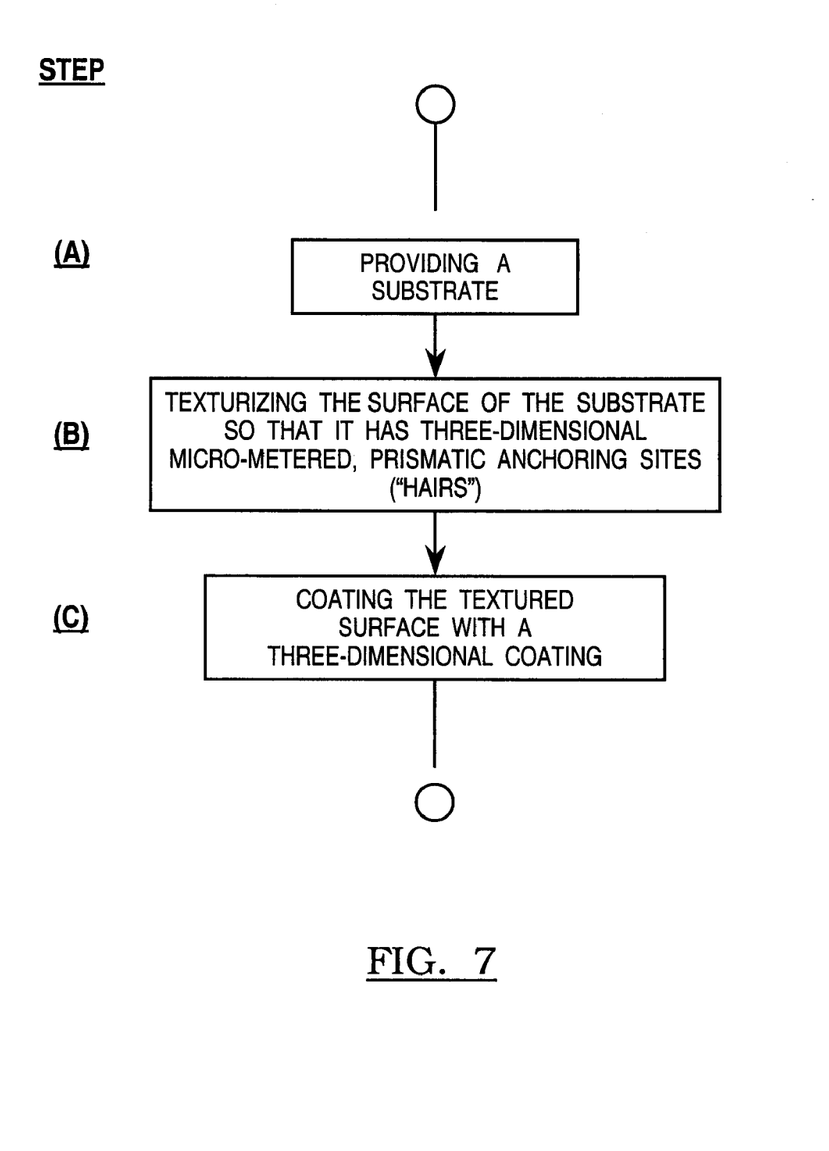
FIG. 7 is a process flow diagram that illustrates the steps in practicing the disclosed invention.

FIG. 7 illustrates the main processing steps by which the wear system of the present invention are prepared:

Step (A) involves providing a substrate;

Step (B) involves texturizing the surface of the substrate so that it has three-dimensional, micro-metered, prismatic anchoring sites ("hairs"); and Step (C) includes coating the textured surface with a substantially conforming three-dimensional coating. The substantially conforming coating is a result of filling the texture of the substrate with a non-solid phase which then solidifies.

There are various alternative ways of applying the coating 24 to the textured substrate. Many suitable techniques are disclosed in the background art section of this patent application. Similar comments are applicable to alternative ways in which the spaces 16 may be engineered into the surface 13 of the substrate 12.

In some applications, the substrate is a material selected from the group consisting of steel, aluminum, magnesium, alloys thereof, tungsten carbide, and mixtures thereof, titanium, copper, and brass. The coating is a material selected from the group consisting of titanium nitride, aluminum oxide, diamond, diamond-like carbon, cubic boron nitride, titanium carbo-nitride, titanium carbide, titanium aluminum nitride, chrominium nitride, and mixtures thereof. It will be appreciated that the invention is not limited to the specific substrate or coating materials listed and that the general concepts of the application can be extended to other materials and combinations thereof.

The effectively-thick 3-D coating portion of the innovation illustrated in FIG. 3 shows how a micro-geometric texture, such as circular prismatic "hairs," can be created and then coated. The coating may grow on the sides of the hairs to fill in the space between them. Since the coating will cover most surfaces with a similar thickness, about 25 μm for example, the spaces between the hairs will be completely filled due to transverse coating growth between them. Since the coated "heights" (of the hairs) will be short, e.g., about 100-250 μm, and the predominant process load (in-plane friction force) will be "normal" to the coated hair peripheries, delamination will be minimal even if coatings beyond the illustrative 25 μm thicknesses are sought.

It is recognized that the system may have hairs of the substrate that will be exposed once the top layer (e.g., 25 μm) is worn through. However, in the example shown, the area fraction of coating is about 89.9% (88.9% if the hairs are made with a hexagonal or square cross-section and 93.8% if the hairs are made with a triangular cross-section). Other relationships are reflected in the table on the next page:

|  | S/D = 0.5 | S/D = 0.75 | S/D = 1 | S/D = 1.25 | S/D = 1.5 | S/D = 2 |
| --- | --- | --- | --- | --- | --- | --- |
| Round | 59.7 | 70.4 | 77.3 | 82.1 | 85.5 | 89.9 |
| Hexagonal | 55.6 | 67.3 | 75.0 | 80.2 | 84.0 | 88.9 |
| Square | 55.6 | 67.3 | 75.0 | 80.2 | 84.0 | 88.9 |
| Triangular | 67.3 | 77.9 | 84.0 | 87.9 | 90.5 | 93.8 |

It may be expected that the material flowing over the surface will not protrude below the hard coating to prematurely erode the substrate hairs below the hard coating surface.

FIGS. 2-3 are intended to be non-limiting, representative examples. Other hair crown profiles such as square, triangular or hexagonal hair cross-sections may provide more uniform gap filling.

In terms of effective coating thickness, MEMS thin film material research (Siemroth and Schuelke, 2000; Shemansky et al., 1989) suggests that even thicker coatings (deeper channels/gaps) can be achieved with an appropriate draft angle (FIG. 5) to avoid keyholing (creation of an air pocket below the final surface).

The proposed innovation distinguishes itself from other approaches in that it attempts to effectively thicken the coating without increasing coating time.

There is a variety of abrasive applications that could benefit from a solution to the problems of wear. For instance, any product surface that is exposed to high-temperature contact wear and/or to sand or other abrasive environmental factors could benefit. Some examples include valve-seat inserts in engines, tank/vehicle track components, including rings on the road wheels and wear regions on the center supports, wear components in molds, turbine blades, and running surfaces of shafts allowing harder bushings. Many of these other applications would benefit by allowing better (e.g., lightweight, lower cost) substrate materials to be used with the hard wear resistant coating applied only where needed—on the surface and only in the regions of contact. For instance, valve-seat insets are made out of very hard cast or powder-metal-formed steel blanks that are then hard machined and ground. Applying the disclosed invention to a more easily machined substrate of plain carbon steel, or another easily machined metal alloy that provides good thermal conductivity (a desired characteristic in this application), can provide an improved balance of all desirable characteristics—easy machinability, good wear resistance, and good thermal conductivity.

For the case of tank-track parts, the push to lighter-weight military vehicles is made very difficult by the poor wear characteristics of lighter-weight materials (such as aluminum and magnesium alloys). Applying the invention to these lightweight substrates and doing so in the wear regions only, can again provide a balance of desired characteristics, including wear resistance in targeted regions. The same holds for commercial off road vehicle tracks where current steel components could be made more wear resistant.

In the case of molds, especially those used with glass-filled polymers, high wear is seen in some regions. Applying the invention in those high wear regions could greatly lengthen the rework-to-rework period and thus prolong the useful life of these expensive tools.

Turbine blades, for example, experience wear at their tips where they contact the shroud. They also wear on the leading and trailing edges in the hot gas flow. Due to their high cost, they are refurbished by adding material and remachining. The cost of tear down and rebuild is very high. Applying the invention to these specific surfaces would greatly lengthen the rework-to-rework period (and protract the mean time between failures).

In the case of shafts in bushings, bushings are made of a softer material so they wear out and are replaced, rather than replacing the more expensive shaft. Applying the invention to the shaft would allow a harder bushing material to be used. According to Archard's equation v=KPL/H, where V is the wear volume, P is the normal load, L is the sliding distance, H is the hardness of the softer material, and K is a constant, this would proportionally decrease the bushing wear rate, again increasing rework-to-rework period.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wear surface system having the characteristic of improved resistance to wear, the system comprising:
   a substrate having a surface in which are defined three-dimensional, micro-metered, prismatic anchoring sites comprising regularly spaced hairs having an average height ($H_p$) of 100-200μ and diameter (D) of about 25μ that are separated by at least some spaces positioned around at least some of the hairs, the spaces having an average dimension (S) of about 25-75μ, at least some of the hairs having a plateau and side surfaces to which a coating may adhere;
   a coating applied by vapor deposition to the plateaus and side surfaces of at least some of the hairs, the coating having an interfacial surface with substantially conforming three-dimensional features that mate with at least some of the hairs of the anchoring sites and an outside surface that is substantially planar, the coating becoming hardened upon solidification and being relatively immune from delamination due to internal and externally applied stresses during exposure to normal wear conditions.

2. The system of claim 1, wherein the substrate has a hardness of $V_s$ and the coating upon solidification has a hardness of $V_c$, where $V_s < V_c$.

3. The system of claim 1, wherein the coating upon solidification has a thickness ($T_c$) and effective thickness $T_c$ and the micro-metered, prismatic anchoring sites include hairs that have an average height ($H_p$), wherein the ratio of $T_c : H_p$ is in the range of 1:4 to 1:10.

4. The system of claim 1, wherein the coating upon solidification has a coefficient of thermal expansion ($CTE_c$) and the micro-metered, prismatic anchoring sites include hairs that have a coefficient of thermal expansion ($CTE_s$), wherein $CTE_c$ is approximately the same as $CTE_s$.

5. The system of claim 1, wherein at least some of the hairs are separated by a distance (S) that is about 50 microns.

6. The system of claim 5, wherein the spacing (S) is about twice the average coating thickness ($T_c$) of at least some of the hairs.

7. The system of claim 1, wherein the substrate is a material selected from the group consisting of steel, aluminum, magnesium, titanium, copper, brass, alloys thereof, tungsten carbide, and mixtures thereof.

8. The system of claim 1, wherein the coating is a material selected from the group consisting of titanium nitride, aluminum oxide, diamond, diamond-like carbon, cubic boron nitride, titanium carbo-nitride, titanium carbide, titanium aluminum nitride, chromium nitride, and mixtures thereof.

9. The wear surface system of claim 1, wherein the hairs have a cross-section along a line substantially parallel to a basal surface of the substrate, the cross-section having a shape selected from the group consisting of circular, oval, elliptical, hexagonal, polygonal, triangular, square, rectangular, and combinations thereof.

10. The system of claim 1, wherein the substrate comprises a portion of a tooth of a cutting tool.

11. The system of claim 1, wherein the substrate is selected from the group consisting of a portion of a valve seat for accommodating an insert thereto in an internal combustion engine, tank/vehicle track components, including rings on the road wheels and wear regions on the center supports, wear components in molds, turbine blades, running surfaces of shafts allowing harder bushings.

12. The system of claim 1, wherein an area fraction of the coating is about 89.9 percent where the hairs are generally circular in section, 88.9 percent where the hairs have an hexagonal or square cross-section, and about 93.8 percent where the hairs have a triangular cross-section.

13. The wear surface system of claim 1 further including a draft angle (α), where α>0.

14. The wear surface system of claim 1 further including a draft angle (α), where α<0.

15. A method for improving the wearability of a surface comprising the steps of:
   providing a substrate having a surface;
   texturizing the surface so that it is at least partially imbued with three-dimensional, micro-metered, prismatic anchoring sites having regularly spaced hairs with plateaus and side surfaces and an average height to which a coating may adhere ($H_p$) of 100-200μ and diameter (D) of about 25μ, at least some of the hairs including at least one wall and at least one plateau that are separated by at least some spaces with an average dimension (S) of about 25-75μ, thereby creating a crenulated surface;
   coating by vapor deposition at least some of the plateaus and side surfaces of at least some of the hairs with a three-dimensional coating having an interfacial surface with substantially conforming three-dimensional features that mate with at least some of the hairs of the anchoring sites and an outside surface that is substantially planar, the coating becomes hardened upon solidification and is relatively immune from delamination due to internal and externally applied stresses during exposure to normal wear conditions.

16. The method of claim 15, wherein the substrate has a hardness of $V_s$ and the coating upon solidification has a hardness of $V_c$, where $V_s < V_c$.

17. The method of claim 15, wherein the coating upon solidification has a thickness ($T_c$) and the micro-metered, prismatic anchoring sites include hairs that have an average height ($H_p$), wherein the ratio of $T_c:H_p$ is in the range of 1:4 to 1:10.

18. The method of claim 15, wherein the coating upon solidification has a co-efficient of thermal expansion ($CTE_c$) and the micro-metered, prismatic anchoring sites include hairs that have a co-efficient of thermal expansion ($CTE_s$), wherein $CTE_c$ is approximately the same as $CTE_s$.

19. The method of claim 15, wherein the coating step includes the step of applying the coating to the sides and the plateaus of at least some of the hairs of the prismatic anchoring sites.

20. The method of claim 15 wherein the hairs have an average cross-sectional dimension D that is about 25 microns and spacing S that is about 50 microns.

21. The method of claim 15 wherein the average ratio of $H_p$ to cross-sectional dimension D+spacing S is about 2:1.

\* \* \* \* \*

UNITED STATES PATENT AND TRADEMARK OFFICE
CERTIFICATE OF CORRECTION

PATENT NO. : 7,651,758 B2
APPLICATION NO. : 11/253140
DATED : January 26, 2010
INVENTOR(S) : William J. Endres Page 1 of 1

It is certified that error appears in the above-identified patent and that said Letters Patent is hereby corrected as shown below:

Column 8, Line 54, Claim 15:

After "side surfaces" insert -- to which a coating may adhere --.

Column 8, Line 54-55 Claim 15:

After "average height" delete "to which a coating may adhere".

Signed and Sealed this

Twenty-third Day of March, 2010

David J. Kappos
*Director of the United States Patent and Trademark Office*